Nov. 20, 1951    S. CONKLIN    2,575,796
REFRIGERATING CABINET FOR MILK SAMPLES
Filed Aug. 20, 1948
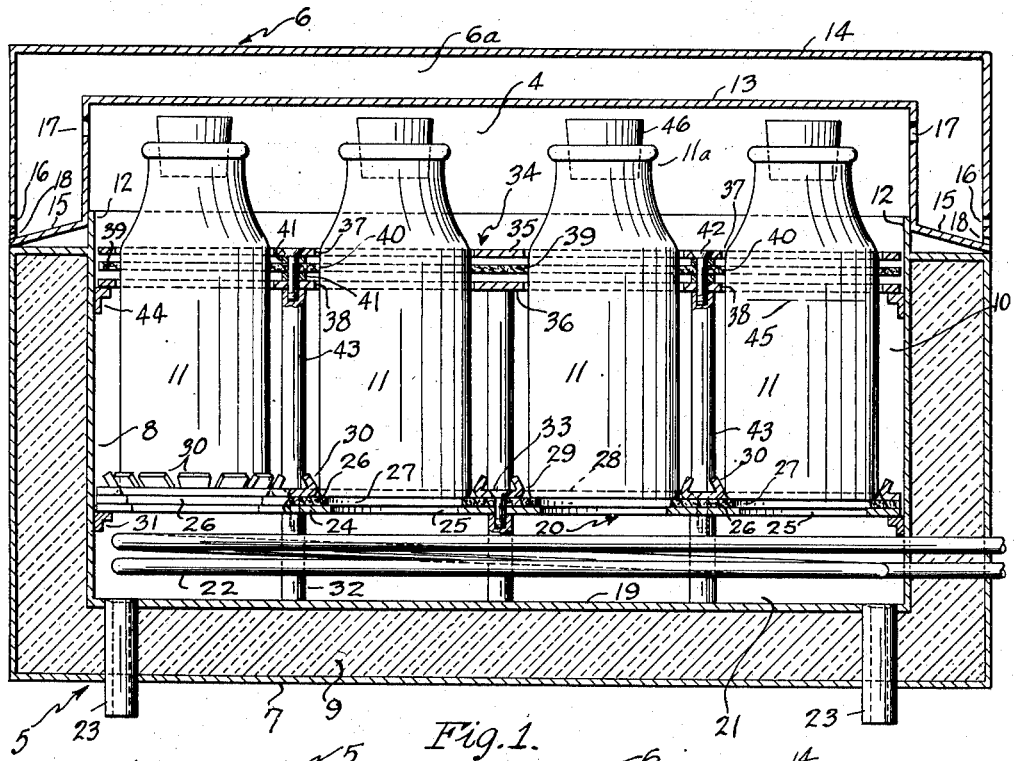
Fig. 1.
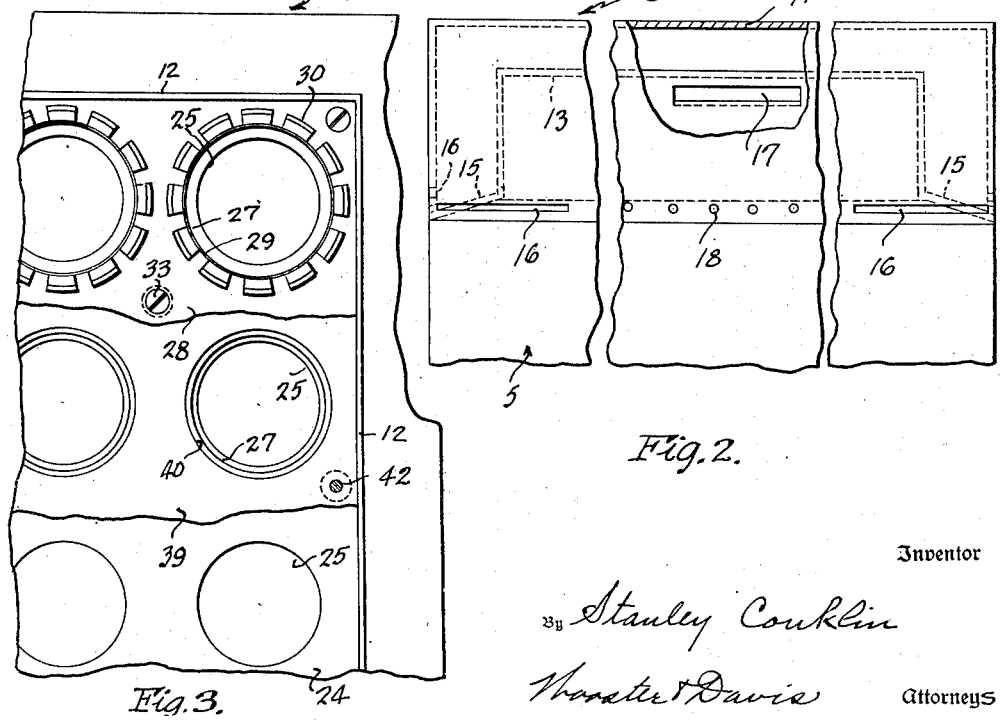
Fig. 2.
Fig. 3.
Inventor
By Stanley Conklin
Wooster & Davis    Attorneys

UNITED STATES PATENT OFFICE 2,575,796

REFRIGERATING CABINET FOR MILK SAMPLES

Stanley Conklin, Cobleskill, N. Y.

Application August 20, 1948, Serial No. 45,307

11 Claims. (Cl. 62—141)

This invention relates to a refrigerating cabinet for milk samples, and has for an object to provide an improved cabinet for properly conditioning farmers' composite milk samples for testing throughout the entire sampling period of fifteen days.

Since the farmer gets paid for his milk on a basis of the butter-fat content, it is also an object to provide a device which will keep these samples in the best possible condition in order to insure him of the benefit of all the fat content in his samples.

It is another object of this invention to provide a construction of cabinet which will refrigerate the milk in the bottles, but will leave the cork and neck of the bottle at substantially room temperature, so there will be no condensation of moisture on the cork and neck which will be apt to flow back into the bottle on removal of the cork to add water to the milk samples, and thus adversely affect the test analysis of the samples.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a vertical section through the cabinet;

Fig. 2 is a side elevation of the upper portion thereof with parts broken away to more clearly show the construction, and Fig. 3 is a top plan view of a portion of the lower member or body of the cabinet with certain parts broken away to more clearly show the construction.

Where the milk-fat content of milk is used as a basis for payment or settlement for such milk, a composite sample of the milk is prepared. Such a composite sample is a combination in one container of representative and approximately proportional amounts from each successive delivery by a producer, to be taken from such milk immediately following each delivery, and usually samples are taken for about fifteen days, the total amount of milk combined during this period being not less than 140 ml., and during this period it is necessary to preserve the composite samples in the best condition for suitable testing and analysis.

It is also important to prevent contamination or dilution of the samples by entrance of moisture to them through condensation on the stoppers or necks of the bottles or by splashing of water into them from cleaning operations around the milk house.

This improved cabinet is designed for this purpose, and comprises a lower body or cabinet section 5 and an upper or cover section 6. The lower or body section comprises spaced outer and inner walls 7 and 8 with the space between them filled with suitable heat or cold insulating material 9, the inner member 8 forming a compartment or chamber 10 for the bottles 11 to hold the composite samples of milk. About the upper rim of this compartment is an upwardly extending flange or strip 12 to prevent water being splashed into the inside of the cabinet, and the top open side is closed by cover or closure 6. This cover is also provided with spaced inner and outer walls indicated at 13 and 14, and their lower peripheries are joined by a downwardly and outwardly inclined wall 15. The space 6a between these walls is not filled with insulating material, but this space is ventilated as well as chamber 4 through which air may circulate. For this purpose the outer wall is provided with suitable ventilating slots 16 preferably located at the lower portion of this wall, and the inner wall is provided with similar ventilating slots 17 preferably located at the upper part of the upright portions of this wall, so as to be on a different level and out of alignment with the openings 16, to prevent water which might splash in through the slots 16 from passing into the interior of the cabinet. The outer walls are also provided with drain-out openings 18 at the lower edge thereof just above the wall 15 to drain out any moisture that might collect within the cover or be splashed into it during the cleaning operation. These drain-out openings could be the ventilating openings if preferred, or different openings for this purpose can be employed, it also being preferred to provide these openings on all four sides of the cover. The cover is substantially the same size as the body portion 5 and rests on the top rim thereof, but the inner wall is telescoped within the upright rim or wall 12 to retain the cover in position and also form a joint which will prevent water splashing into the cabinet.

Within the body or lower portion of the cabinet is provided means for supporting the bottles 11 for the samples. In the lower portion but spaced above the bottom wall 19 is a bottle-supporting and heat transfer assembly 20. As this assembly is spaced above the bottom wall 19 it forms a refrigerating compartment 21 in which are refrigerating coils 22 for circulation of refrigerant from any suitable refrigerating apparatus (not shown), and a reserve heat or bottle chamber 10 above it. The temperature of the milk is also controlled by any suitable type of thermostat (also not shown, as it of itself forms no part of the present invention). Leading through the bottom wall are drainpipes 23 for carrying off any condensation from the refrigerating compartment, particularly during defrosting operations.

The assembly 20 comprises a lower plate 24, preferably of steel, through which are a suitable number of openings 25, and this plate supports a heat insulating gasket 26 of suitable fibrous material or rubber, which is also provided with a series of openings 27 in alignment with the openings 25 of the lower plate. On top of the gasket 26 is a light metal plate 28 to protect the gasket 26, provided with openings 29 in alignment with the openings 25 and 27, but these openings are surrounded with a flared rim or lugs 30 which act as guides to direct the lower end of the bottle into the opening and retain it in the opening. The opening 29 is slightly larger than the diameter of the bottle so that it will readily fit in the opening, and this opening is also somewhat larger than the opening 27 in the gasket, while this latter opening 27 is also somewhat smaller than the diameter of the lower end of the bottle so that the outside rim portion of the bottle will rest on the gasket around the edge of the opening 27. The opening 25 in the lower plate is somewhat smaller than the opening 27 so that this plate will provide a suitable support for the gasket and the bottle resting on it. With this construction heat is denied entrance to the refrigerating chamber 21 except through the bottom of the bottle itself, as this bottom is exposed to the chamber through the openings 25 and 27, thus absorbing the heat out of the milk in the bottles. Heat cannot pass around the bottles to this chamber because of the seal formed by the outer rim of the bottle resting on the gasket 26, and this gasket itself provides a heat insulating barrier between the upper chamber 10 and the refrigerating chamber 21. The assembly 20 may be supported by any suitable means, such, for example, as a cleat or strip 31 around the interior of the inner wall, and if desired, especially in larger constructions, supporting legs 32 extending between the plate 24 and the bottom wall 19 between the refrigerating coils so as to rest on this bottom wall may be provided. The plates, the legs and the gaskets may be secured together by any suitable means, such, for example, as the screws 33.

At the top of the chamber 10 surrounding the bottles and just below the necks 11a of the bottles is a heat insulating assembly 34. This comprises upper and lower light metal plates 35 and 36 each provided with openings 37 and 38 respectively, slightly larger than the bottles and spaced to correspond with the spacing of the openings in the lower assembly 20. Between the plates 35 and 36 is a flexible heat insulating gasket 39 of any suitable insulating material, such, for example, as fiber or rubber, and this gasket is provided with openings 40 in alignment with the openings 37 and 38, but of somewhat smaller diameter so as to closely fit the bottles to form a seal around the bottles and prevent passage of heat to the chamber 10. To increase the insulating effect and allow more flexibility to the gasket, the plates and gasket are separated by spacers 41 around the connecting screws 42, and where the size of the cabinet warrants, supporting legs 43 may be provided between this assembly and the lower assembly 20, as well as supporting means 44 around the inner side of the side wall of the cabinet on which the outer peripheral edge of the assembly is supported. With this construction admission of heat to the chamber 10 around the bottles is prevented except through the neck of the bottle itself, and this chamber forms an insulated space surrounding the bodies of the bottles so that the milk is kept cool. As the level of the milk is below the assembly 34, the ultimate milk level or final milk line after fifteen days sampling period being substantially that shown by the line 45 in Fig. 1, and as the temperature of the milk is thermostatically controlled, and the room temperature is always considerably higher, as a result there is much greater heat available above the bottles than can be absorbed by the necks or portions of the milk bottles above the upper assembly 34. The bottle above this assembly never becomes cold even when the cover is in position on the cabinet. Thus there is no condensation of moisture either on the cork or stopper 46 or on the bottle neck. In other words, the stopper and the bottle neck above the assembly 34 is always approximately at room temperature, and this is true even though these cabinets have to be opened and exposed to room temperature during the daily sampling operation, usually three or four hours, and therefore there is no condensation of moisture on the stopper or bottle necks which can flow into the bottle and add water to the samples when the stopper is removed. Under actual sample tests this device has refrigerated the milk in the bottles to 33° F. with the cabinet open and the corks and necks at room temperature. Even with the cabinet closed and the cover in place, with this structure and the ventilation through the cover and about the bottle necks, the temperature under the cover followed the room temperature within four degrees. At no time during several weeks of actual tests and with room temperatures as high as 85° F. was there any condition causing the least bit of condensation on the stopper or bottle neck. This construction also, when the cover is in place, prevents water used in hosing out or cleaning the milk house from splashing into the container and collecting on either the stoppers or the bottle necks.

Having thus set forth the nature of my invention, I claim:

1. A refrigerating cabinet for milk samples comprising a body including heat insulated walls forming a chamber for bottles containing said samples and open at the top, upper and lower vertically spaced partitions across said chamber forming a heat insulated chamber between them with the lower partition spaced above the bottom of the chamber forming a refrigerating space therewith, said lower partition comprising a heat insulating gasket, a lower plate supporting the gasket and an upper protective plate on the gasket, said plates and gasket being provided with aligned openings therethrough, the openings in the gasket being of somewhat less diameter than the bottom ends of the bottles so that the bottles can be supported thereon and exposed directly to the refrigerating chamber through said opening, the openings in the upper plate being of a size to receive the lower ends of the bottles and provided with upwardly flared guiding means at their rims to guide the lower ends of the bottles into these openings and retain them in position over the openings in the gasket, and the upper partition including a heat insulating gasket provided with openings arranged to closely embrace the bottles just below their necks so that these necks with their stoppers are located above this partition.

2. A refrigerating cabinet for milk samples comprising a body including heat insulated walls forming a chamber for bottles containing said samples and open at the top, upper and lower vertically spaced partitions across said chamber forming a heat insulated chamber between them with the lower partition spaced above the bottom of the chamber forming a refrigerating space therewith, said lower partition forming a support for the bottles seated thereon and provided with openings under and in alignment with the bottles to expose their lower end walls directly to the refrigerating space for cooling the contents of the bottles, said upper partition comprising spaced upper and lower plates with an intermediate flexible heat insulating gasket spaced from both the upper and lower plates, and said plates and gasket being provided with aligned openings to receive the bottles, the openings in the gasket being of a size to closely embrace the bottles immediately below their necks to form a seal between the spaces above and below the partition with the bottle necks located above this partition.

3. A refrigerating cabinet for milk samples comprising a body including heat insulating walls forming a compartment open at the top, an upwardly extending peripheral flange around said open top, vertically spaced horizontal insulating walls in said compartment with the lower wall spaced above the bottom of the compartment to form a refrigerating chamber, said wall forming a support for bottles containing said samples and provided with openings to expose the lower end walls of the bottles to the refrigerating chamber to cool the contents of the bottles, the upper wall being provided with openings to closely embrace the bottles just below their necks so that the necks and their stoppers are exposed above said wall, a cover for the compartment resting on top of the body comprising spaced inner and outer walls forming an air space, said inner walls being provided with ventilating openings and the outer walls also being provided with ventilating and drain-out openings out of alignment with the openings in the inner wall to prevent water splashing through them into the compartment, and said inner walls of the cover including upright side walls telescoped with said flange on the outer side thereof.

4. A refrigerating cabinet for milk samples comprising a body including heat insulating walls forming a compartment open at the top, an upwardly extending peripheral flange around said open top, a horizontal heat insulating wall adjacent the top of the compartment provided with openings to closely embrace bottles containing the samples just below their necks so the necks with their stoppers are exposed above said walls, means for refrigerating the lower portions of the bottles, a cover for the compartment resting on the body comprising spaced inner and outer walls forming a ventilating air space, said inner wall including upright side walls telescoped with and embracing the upper portion of said flange, said inner side walls being provided with ventilating openings in their upper portions, and the outer walls being provided with ventilating and drain-out openings in their lower portions.

5. A refrigerating cabinet for milk samples, comprising a body including heat insulated walls forming a compartment open at the top, a heat transferring assembly in the compartment comprising a horizontal partition spaced above the bottom wall thereof forming therewith a refrigerating chamber, said assembly forming a support for sample containing bottles and provided with openings over which the bottles may be supported to expose their lower ends directly to the refrigerating chamber, heat insulating means arranged adjacent said openings to surround the lower ends of the bottles so supported to prevent transfer of heat to said chamber except through the bottoms of the bottles, and a heat insulating means spaced above said assembly and arranged to closely surround the bottles just below their necks when the bottles are mounted on the support to form with the assembly a heat insulated chamber surrounding the bodies of the bottles and to expose the bottle necks and stoppers to room temperature.

6. A refrigerating cabinet for milk samples, comprising a body including heat insulated walls forming a compartment open at the top, upper and lower vertically spaced horizontal insulating partition walls in said compartment forming a heat insulated chamber between them and with the lower wall spaced above the bottom of the compartment to form a refrigerating chamber therewith, said lower wall being provided with openings somewhat smaller than the bottom end walls of the bottles in the heat insulated chamber containing the samples and forming supporting means for the bottles so that their lower end walls are exposed directly to the refrigerating chamber through these openings, and said upper wall being provided with openings arranged to embrace the bottles below their necks when the bottles are mounted on the supporting means to expose the necks and stoppers to room temperatures.

7. A refrigerating cabinet for milk samples, comprising heat insulated walls forming a chamber for the bottles containing said samples, a horizontal heat insulating partition wall spaced above the bottom of said chamber forming a refrigerating chamber therewith, said wall forming a support for bottles seated on said wall and provided with an opening over which each bottle may be supported and substantially the size of the bottle to expose its bottom wall directly to the refrigerating chamber through said opening, and a second horizontal heat insulating wall spaced above the first horizontal wall forming a heat insulated chamber therewith and provided with openings to closely embrace the bottles supported on the first wall in the insulated chamber just below their necks to expose the necks and stoppers to room temperatures and prevent transfer of heat to the space between the horizontal walls except through said necks.

8. A refrigerating cabinet for milk samples, comprising heat insulated walls forming a chamber for the bottles containing said samples, means forming a refrigerating chamber below the bottle chamber including a heat insulating partition between the chambers provided with openings to expose the bottoms of the bottles in said chamber directly to the refrigerating chamber to cool the contents of the bottles, and a top wall for the bottle chamber provided with heat insulating means forming a heat insulated chamber with said partition surrounding the bodies of the bottles and arranged to closely surround the bottles at the upper part of the bottle chamber and just below the necks of the bottles to locate the bottle necks outside said chamber where they are exposed above said latter means and heat is conducted to the chamber through the bottle necks only.

9. A refrigerating cabinet for milk samples, comprising heat insulated walls forming a chamber for the bottles containing said samples, means for supporting the bottles in said chamber in an upright position, vertically spaced horizontal insulating partitions forming upper and lower walls in said chamber forming a heat insulated chamber between them and forming a refrigerating chamber below the lower wall, means for exposing the lower ends of the bottles in the heat insulated chamber directly to the refrigerating chamber for cooling the contents of the bottles through their lower end walls only, and means whereby the necks of the bottles may extend through a position above and closely embraced by said upper wall so as to be exposed to the atmosphere above said wall.

10. A refrigerating cabinet for milk samples comprising walls forming a chamber for the bottles containing said samples and provided with supports for supporting said bottles in an upright position in said chamber, spaced heat insulated walls in the chamber forming a heat insulating space surrounding the bodies of said bottles while their necks and stoppers are exposed to room temperatures and a cooling chamber below the bottles, and said supports arranged to expose the lower ends only of the bottles to the cooling means for cooling the contents of the bottles through their lower end walls only.

11. A refrigerating cabinet for milk samples comprising heat insulating walls forming a heat insulated chamber for the bottles containing said samples including a heat insulating top wall for said chamber, a lower heat insulating wall spaced below the top wall provided with means for supporting the bottles in said chamber in an upright position, said lower wall also forming the top wall of a refrigerating chamber and provided with openings to expose the lower ends of the bottles in said heat insulated chamber directly to the refrigerating chamber for cooling the contents of the bottles in the chamber through their lower end walls, and said top wall being provided with openings arranged to closely embrace the bottles adjacent the juncture of the necks with the bodies of the bottles so that the necks and stoppers are exposed to the atmosphere above said wall.

STANLEY CONKLIN.

REFERENCES CITED

The following references are of record in the file of this patent:

UNITED STATES PATENTS

| Number | Name | Date |
|---|---|---|
| 374,909 | Hopper | Dec. 13, 1887 |
| 502,114 | Fay | July 25, 1893 |
| 657,383 | Becker | Sept. 4, 1900 |
| 1,300,608 | Harris | Apr. 15, 1919 |